United States Patent
Zuo et al.

(10) Patent No.: US 9,858,413 B1
(45) Date of Patent: Jan. 2, 2018

(54) REDUCTION OF FALSE POSITIVES IN MALWARE DETECTION USING FILE PROPERTY ANALYSIS

(71) Applicants: Wei Zuo, Nanjing (CN); Weimin Wu, Nanjing (CN); Tao Shen, Nanjing (CN)

(72) Inventors: Wei Zuo, Nanjing (CN); Weimin Wu, Nanjing (CN); Tao Shen, Nanjing (CN)

(73) Assignee: TREND MICRO INC., Tokyo (JP)

( * ) Notice: Subject to any disclaimer, the term of this patent is extended or adjusted under 35 U.S.C. 154(b) by 167 days.

(21) Appl. No.: 13/935,419

(22) Filed: Jul. 3, 2013

(51) Int. Cl.
*G06F 21/56* (2013.01)
*G06F 21/00* (2013.01)

(52) U.S. Cl.
CPC ............ *G06F 21/561* (2013.01); *G06F 21/56* (2013.01)

(58) Field of Classification Search
CPC ......... G06F 21/56; G06F 21/565; G06F 21/50
USPC ........................................................ 726/24
See application file for complete search history.

(56) References Cited

U.S. PATENT DOCUMENTS

| | | | | |
|---|---|---|---|---|
| 7,779,472 B1* | 8/2010 | Lou ................ | G06F 21/566 | 726/22 |
| 8,087,086 B1* | 12/2011 | Lai ................. | G06F 21/56 | 726/24 |
| 8,161,548 B1* | 4/2012 | Wan ................ | G06F 21/566 | 713/188 |
| 8,225,406 B1* | 7/2012 | Nachenberg ...... | G06F 21/577 | 726/22 |
| 8,312,547 B1* | 11/2012 | Sobel .............. | G06F 21/567 | 707/705 |
| 8,539,583 B2* | 9/2013 | Singh .............. | G06F 17/30109 | 726/24 |
| 8,627,469 B1* | 1/2014 | Chen ............... | H04L 63/145 | 726/22 |
| 8,640,245 B2* | 1/2014 | Zaitsev ............ | G06F 21/56 | 726/25 |
| 8,719,935 B2* | 5/2014 | Polyakov ......... | G06F 11/0748 | 726/23 |
| 2009/0038011 A1* | 2/2009 | Nadathur .......... | G06F 21/565 | 726/24 |
| 2012/0079596 A1* | 3/2012 | Thomas ........... | G06F 21/55 | 726/24 |

* cited by examiner

*Primary Examiner* — Linglan Edwards
(74) *Attorney, Agent, or Firm* — Beyer Law Group LLP (57) ABSTRACT

A virus detection engine determines that a file is suspected of being malware. A property is retrieved, along with the same file property of other executable files within the same folder. If the property value is similar to property values of the other files then the suspect file is benign. If the number of matches is greater than a threshold then the suspect file is benign. Other file properties of the suspect file are compared. If no file properties are similar to properties of the other files then the suspect file is malware and an alert is generated. The longest common subsequence compares property values. The same property value may be added to files within the same folder after these files are installed on the computer but before any detection takes place. A comparison of the same property values concludes that files are not malware, even if they are suspect.

27 Claims, 7 Drawing Sheets

FIG. 1

Folder with Files

FIG. 2
File Properties

FIG. 3
Folder with Files

FIG. 4
File Properties

REDUCTION OF FALSE POSITIVES IN MALWARE DETECTION USING FILE PROPERTY ANALYSIS

FIELD OF THE INVENTION

The present invention relates generally to reducing the number of false positives detected when determining if files contain malware. More specifically, the present invention uses an analysis of file properties to reduce false positives.

BACKGROUND OF THE INVENTION

In order to detect malicious software on a computing device such as a computer or mobile telephone, an antivirus service provider uses a variety of techniques such as traditional file scanning using virus signatures, heuristics and white lists. The antivirus software may be present on the user's computing device or a remote server may be used to provide an antivirus service.

Current technology focuses on constructing large databases of white lists which contain signatures of normal files; if the signature of a suspect file matches a signature in the white list then the file is considered benign. Thus, once a file is considered suspect, instead of determining that the file is malware (and possibly producing a false positive), the signature of the file is compared to the white list. A match indicates a benign file and a false positive is avoided. Unfortunately, though, these white list databases can become extremely large and must be updated each time a file is modified, increasing complexity and decreasing performance. In addition, the larger the size of the database the greater the decrease in performance of performing a white list query.

Accordingly, new techniques are desired to reduce the number of false positives in the course of malware detection that do not rely upon white lists.

SUMMARY OF THE INVENTION

To achieve the foregoing, and in accordance with the purpose of the present invention, a technique is disclosed that reduces false positives in the course of malware detection.

In a first embodiment, a suspect file may be considered benign if its file properties are similar to file properties of other files within its own folder or sub-folder's. Once the suspect file is detected by a virus detection engine, a specific one of its file properties is retrieved, along with the same file property of other executable files within the same folder. If the property value of the suspect file is similar to (or the same as) a certain number of property values of the other executable files within the same folder then it may be concluded that the suspect file is a legitimate file and is not malware. In other embodiments, two or more properties of the suspect file may be required to match with properties of the other executable files before a conclusion is made that the suspect file is not malware.

In a second embodiment, a suspect file may be considered malware if its file properties are not similar to file properties of other files within its own folder or sub-folder's. Once the suspect file is detected by a virus detection engine, a specific one of its file properties is retrieved, along with the same file property of other executable files within the same folder or sub-folders. If the property value of the suspect file is not similar to any of the property values of the other executable files within the same folder or sub-folders then it may be concluded that the suspect file is not a legitimate file and is malware. Other specific file properties of the suspect file may also be compared to those of the other executable files. If one or more of certain specific file properties of the suspect file are not similar to file properties of the other executable files then a determination is made that the suspect file is malware and an alert is generated along with optional malware cleaning.

In one specific embodiment, the present invention uses the longest common subsequence algorithm to compare property values between the suspect file and any number of other executable files within the same folder or sub-folder. If a certain number of other executable files have a property value similar to the property value of the suspect file (or contain the longest common subsequence) then it may be determined that the suspect file is not malware. In a very specific embodiment, the ratio of the number of other executable files having a similar property value and the total number of executable files in the folder is compared to a threshold value.

In a third embodiment, the same predetermined property value (or values) are added to executable files within the same computer folder after these files have been installed on the user computer but before any malware detection takes place. In this fashion, all of these executable files will have at least one property value in common, and if the present invention is arranged to retrieve and compare this particular property, then it may be determined that these files are not malware, even if they are suspect.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Malware operates using many different mechanisms, although one common technique used by malware is "to drop" (or create) a malicious file into a particular folder (or directory, etc.) on a computer. It has been realized that the file properties of a malicious file are generally not similar to the file properties of other files within the same folder or sub-folder. This information can be used to determine whether or not a particular file might be benign. For example, if a particular file is considered suspect, but its file properties are the same as or very similar to other files within the same folder, then it may be determined that the file is benign, and thus a false positive is avoided. More specifically, it is realized that a vendor of normal applications will sign its files using consistent rules that are known and can be determined.

File Comparison Examples

Figure 1:
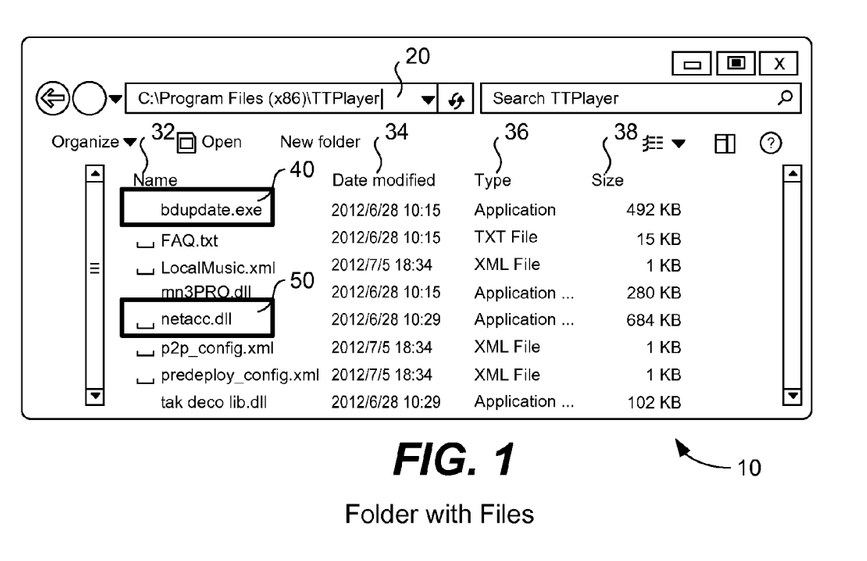
FIG. 1 illustrates an example in which a suspect file has properties similar to another file within the same folder

FIG. 1 illustrates an example in which a suspect file has properties similar to another file within the same folder. Shown is a window 10 displayed on the screen of a computing device (such as a desktop computer, laptop computer, tablet computer, mobile telephone, etc.) that includes a listing of the contents of a folder 20 ("TTPlayer"). The contents of the folder include, for example, the name 32 of each file, the date modified 34, the type of file 36, the size 38, and may also list other properties of each file such as digital signature, file description, type, file version, product name, product version, copyright notice, size, date modified, language, original file name, etc.

Although not shown, the contents of folder 20 may also include other folders (sub-folders) as it is common for software applications to include a hierarchy of folders in order to better organize their contents. In this simple example, file 40 has been detected as a file being suspected of being malware. The properties of file 40 may be compared against the properties of other files in this folder (or sub-folder), and in particular against file 50 as is explained below.

Figure 2:
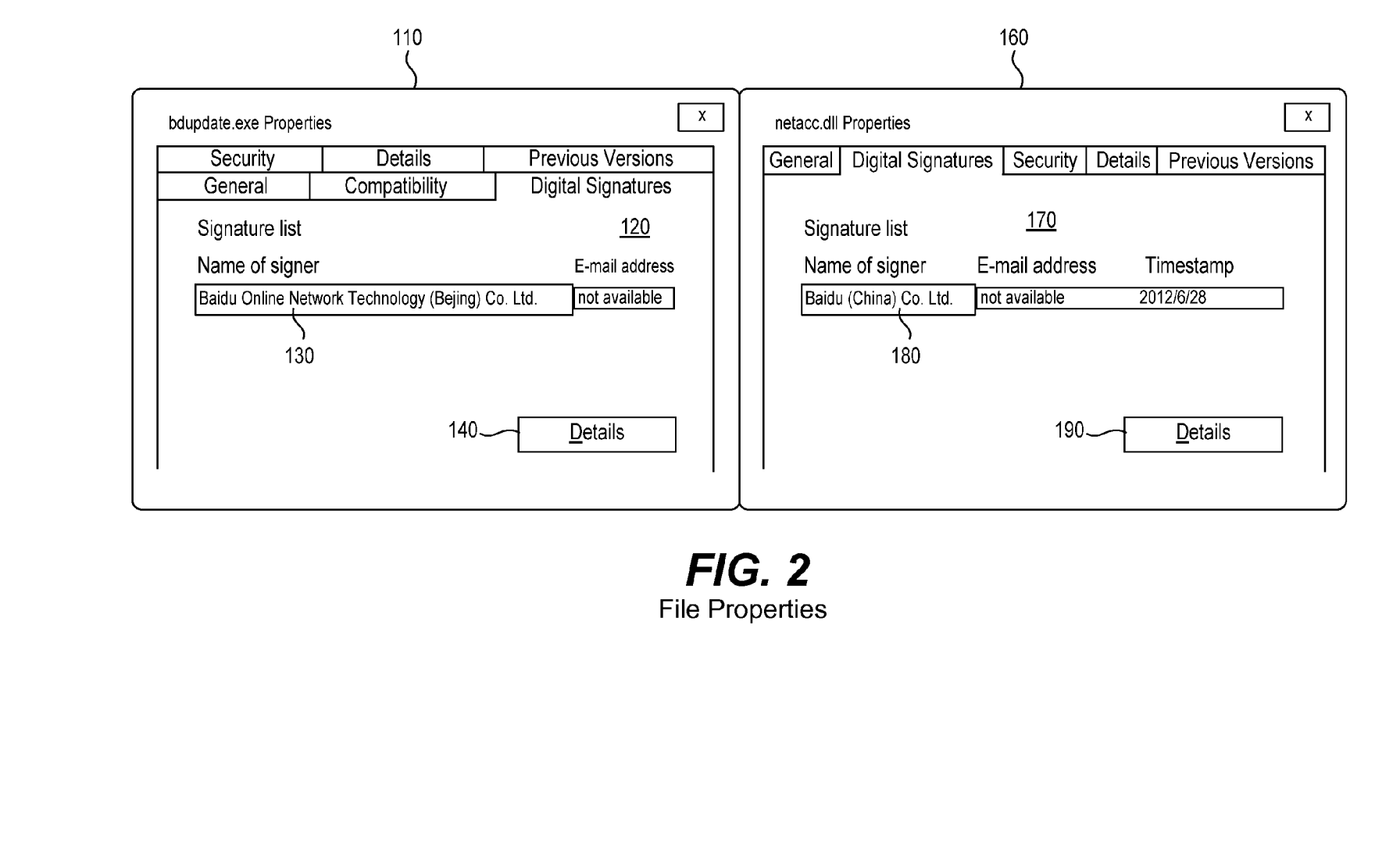
FIG. 2 shows a property of a suspect file being compared against a property of another file from the same folder.

FIG. 2 shows a property of a suspect file being compared against a property of another file from the same folder. In this example, window 110 shows the properties of file 40 and window 160 shows the properties of file 50. A file typically has a variety of types of properties related to security, details, versions, general, compatibility, digital signatures, etc., and each type of property includes a list of specific file properties. In this specific user interface, specific properties are available under a tab for each general type of property. For example, under the "general" tab, properties such as the type of file, its description, its location, size, creation date, modification date and access date are listed. Under the "version" tab the following properties are listed: company name, file version, internal name, language, original file name, product name, and product version. The "summary" tab lists properties that may be entered by the end user such as: title, subject, author, category, keywords, and comments. The tabs other than the "Summary" tab include specific property information that is either filled in automatically by the operating system, entered by the vendor of the software application, or entered by a third party digital signature tool or tools. Typically, most of these properties can be entered using the third party tool by invoking operating system APIs.

In this specific example, property information included under the "digital signatures" tab is used for comparison. Under the digital signatures tab 120, it may be seen that the name of the signer 130 for the suspect file is "Baidu Online Network Technology (Beijing) Co. Ltd." In comparison, under the digital signatures tab 170, it may be seen that the name of the signer 180 for another file in the folder is "Baidu (China) Co. Ltd." Thus, an informal comparison of the two company names (or even a formal algorithmic comparison) would conclude that the two files are likely from the same company, that the suspect file 40 is likely a legitimate file within folder 20, and that suspect file should not be flagged as being malware (which would likely be a false positive).

Other information within this tab that may also be used for comparison is the e-mail address of the signer and a timestamp. Further details available under details button 140 or 190 are the name of the corporation, an e-mail address, a signing time and the actual certificate (including company name, issuer, and validity period). Of course, other specific property information (other than the company name) found within properties windows 110 or 160 may also be used for comparison, and property information may be obtained from other sources. And, property information for the suspect file 40 may be compared against property information of other files within folder 20 and against property information of files in any sub-folder.

Figure 3:
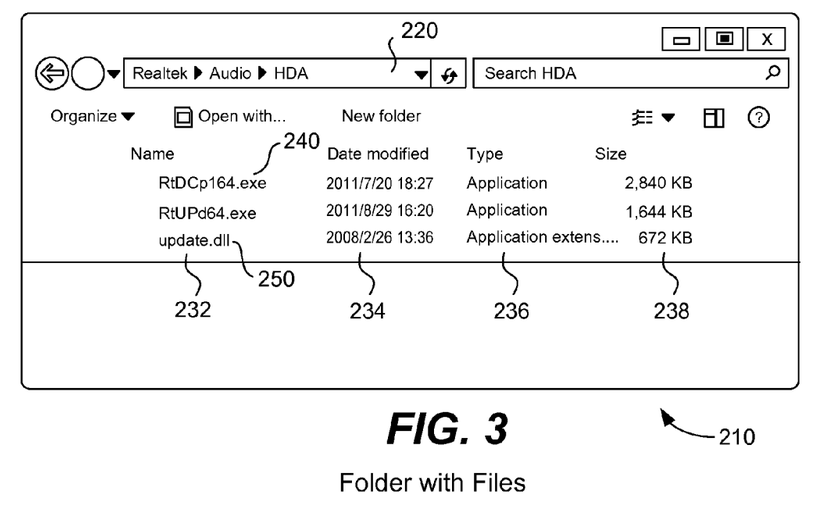
FIG. 3 illustrates an example in which a suspect file has properties different from another file within the same folder.

FIG. 3 illustrates an example in which a suspect file has properties different from another file within the same folder. Shown is a window 210 displayed on the screen of a computing device (such as a desktop computer, laptop computer, tablet computer, mobile telephone, etc.) that includes a listing of the contents of a folder 220 ("Realtek/Audio/HDA"). The contents of the folder include, for example, the name 232 of each file, the date modified 234, the type of file 236, the size 238, and may also list other properties of each file such as digital signature, file description, file version, product name, product version, copyright.

Although not shown, the contents of folder 220 may also include other folders (sub-folders) as it is common for software applications to include a hierarchy of folders in order to better organize their contents. In this simple example, file 250 has been detected as a file being suspected of being malware. The properties of file 250 may be compared against the properties of other files in this folder (or sub-folder), and in particular against file 240 as is explained below.

Figure 4:
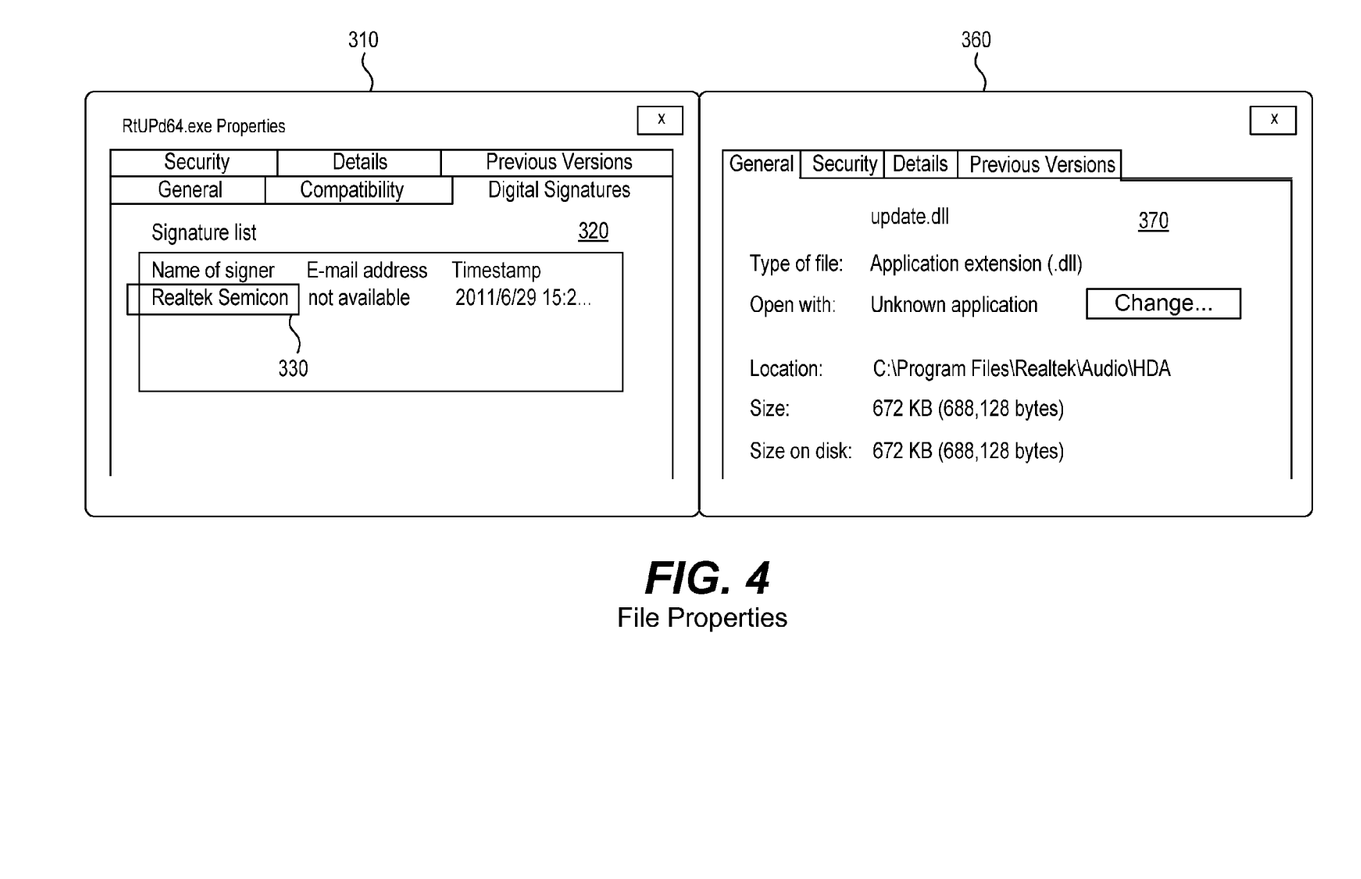
FIG. 4 shows a property of a suspect file being compared against a property of another file from the same folder.

FIG. 4 shows a property of a suspect file being compared against a property of another file from the same folder. In this example, window 310 shows the properties of file 240 and window 360 shows the properties of suspect file 250. A file typically has a variety of types of properties related to security, details, versions, general, compatibility, digital signatures, etc., and each type of property includes a list of specific file properties, although each file may not necessarily have each type of property nor specific properties.

In this specific example, property information included under the "digital signatures" tab is used for comparison. Under the digital signatures tab 320, it may be seen that the name of the signer 130 for the supposedly normal file 240 is "RealtekSemiconductor." In comparison, under the general tab 370, it may be seen that the suspect file 250 has no product name or company name, and that there is not even any digital signatures tab.

Thus, an informal comparison of the company name or product name properties for these two files (or even a formal algorithmic comparison) would conclude that these two files are not from the same company, that the suspect file 250 is likely not a legitimate file within folder 20, and that suspect file should be flagged as being malware (which would likely not be a false positive). Of course, property information for the suspect file 250 may be compared against property information of other files within folder 20 and against property information of files in any sub-folder.

Flow Diagrams

Figure 5:
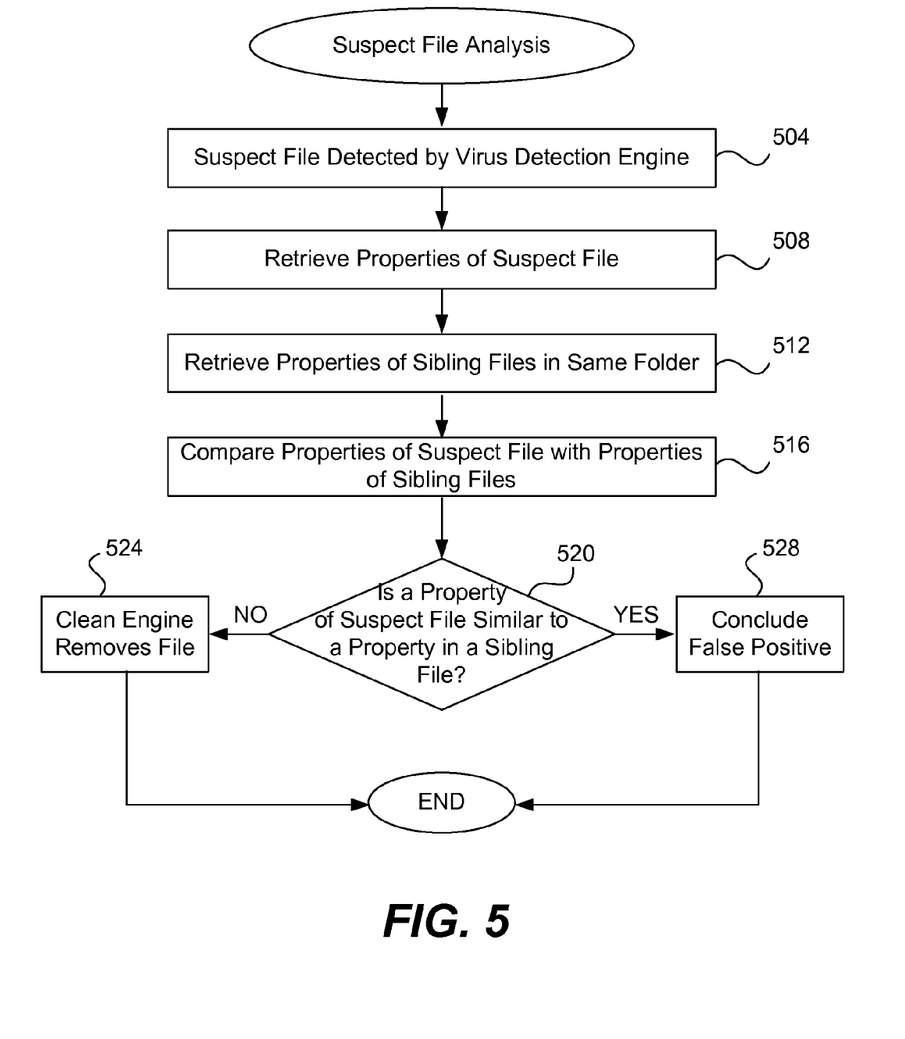
FIG. 5 is a flow diagram describing one embodiment in which one or more files are compared in order to avoid false positives.

FIG. 5 is a flow diagram describing one embodiment in which one or more files are compared in order to avoid false positives. The below steps may be implemented by a software module on the computing device in question, or, a remote software service available over the Internet may be used to analyze and compare two or more files present on the computing device.

In a first step 504, any of a variety of virus detection engines detects a file on the computing device that is suspected of being malware. Detection may be performed using antivirus software such as traditional file scanning using virus signatures, using heuristics or behavior-based analysis to detect known or unknown malware, using emulation or "sandbox" technology, remote services, or other techniques.

In one specific example, an antivirus software product available from Trend Micro Inc. named Trend Micro Threat Mitigation (TMTM) includes a malware detection engine named Total Discovery Mitigation Engine (TDME) that includes the present invention.

In step 508 properties of the suspect file are retrieved for future comparison against other files. For example, any of the properties shown and described in FIGS. 1-4 may be retrieved, and in particular, the properties company name and product name are used. Further, the property values of digital signature, file description, file version, product version, and copyright may also be useful for comparison. In order to retrieve the properties associated with a particular file an API or OS service may be used. For example, invoking the API VerQueryValue( ) (under the Microsoft operating system) retrieves file properties such as: file description, file version, product name, product version, and copyright. Querying using the CryptSvc service will retrieve the catalog digital signature of signed file.

In step 512 the same properties retrieved for the suspect file are retrieved for any of the sibling files in the same folder as the suspect file. Depending upon the operating system, the unit of organization for grouping files may be termed a "folder," "directory," or other similar term that indicates a group of files. As used herein, the term "folder" encompasses all of these other terms. In addition, properties may be retrieved for any files present in a sub-folder of the current folder. Although properties for any file may be retrieved, typically it is the executable files in an operating system that are at risk and that may be suspect. Thus, within the Microsoft operating system, properties for portable executable (PE) files such as .exe and .dll files are retrieved for use in a comparison. Under the Apple operating system, properties for Mach object files (so called "Mach-O" files, ".o, .dylib, or .bundle") are retrieved. Under the Android operating system, properties for dalvik executable files (.dex) files are retrieved.

In step 516 a specific property of the suspect file (such as company name) is compared against the same specific property of one (or more) of its sibling files from the same folder (or sub-folder). This comparison may be performed as described below with reference to FIG. 6. In step 520 it is determined whether or not the two properties are the same or similar enough such that it may be concluded that the properties are essentially the same. If so, then in step 528 it may be concluded that because the properties are essentially the same, that the suspect file does in fact belong within the folder, that its initial detection was likely a false positive, and that no further action needed be taken because the suspect file is benign.

If it is determined that the two properties are not similar, then another property of the two files may be compared or, the specific property of the suspect file (such as company name) may be compared against the same property of another of the sibling files within the folder or sub-folder. If the specific property of the suspect file does not match with any of the same specific properties of any of the sibling files, then in step 524 it may be concluded that the suspect file is actually malware and that a cleaning operation should take place. Step 524 may involve an action as simple as notifying a user or administrator that the suspect file is malware, or an action more complex such as cleaning the suspect file and any of its artifacts from the computing device.

In one specific embodiment, it is necessary that two specific properties of the suspect file (e.g., company name and product name) be similar in some fashion to the same specific property of a number of the sibling files in order for a conclusion to be reached that the suspect file is not malware.

Figure 6:
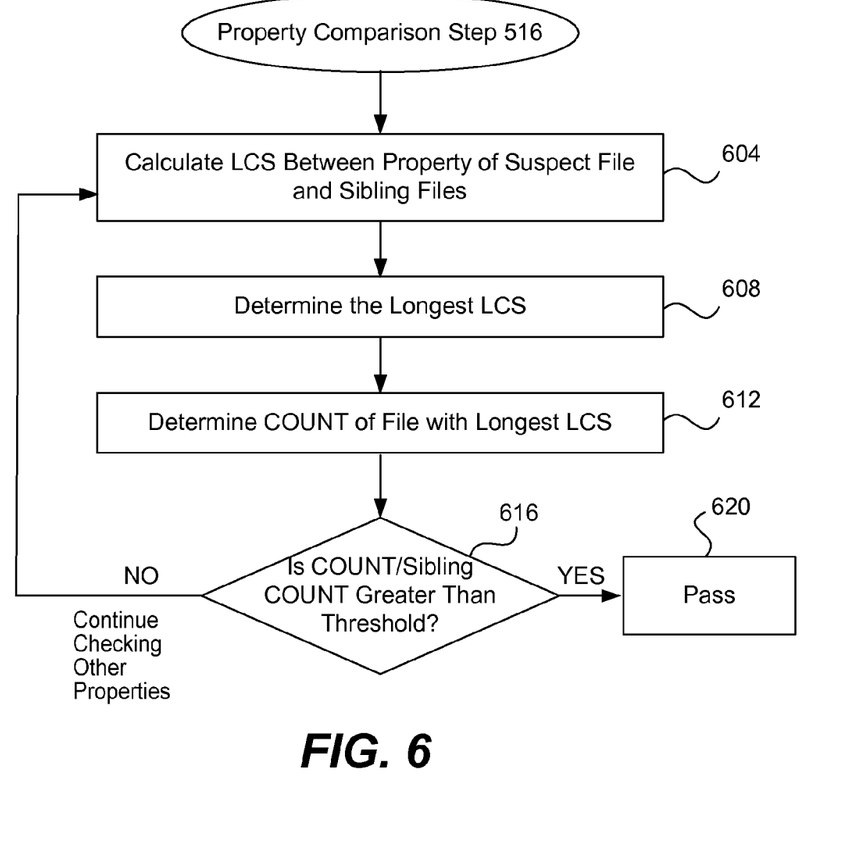
FIG. 6 is a flow diagram describing one specific embodiment by which steps in FIG. 5 may be performed.

FIG. 6 is a flow diagram describing one specific embodiment by which steps 516 and 520 may be performed. In general, steps 516 and 520 determine whether or not a property or properties of a suspect file are similar enough to properties of sibling files such that the suspect file may be determined not to be malware. In one specific embodiment, an algorithm that determines the longest common subsequence (LCS) between two properties is used. Other algorithms that may be used to compare two properties are other string similarity metric algorithms such as the Levenshtein Distance algorithm. In this embodiment, the suspect file is exclusively compared to other executable files within the folder.

In a first step 604, for a particular property such as company name, the LCS is determined between the suspect file and each of its sibling files (in the same folder or including any sub-folders). In other words, the company name of the suspect file is compared against the company name of each of the sibling files and the LCS is determined in each case. For example, with reference to FIG. 2, the LCS between name 130 and the name 180 would be the character sequence "Baidu" and would have a value of five characters. Next, in step 608 the longest LCS out to the entire group is determined. For example, if many of the LCS have a length of three, but the company name of the suspect file matches well with the company name of one particular sibling file and five characters match, then the longest LCS has a value of five.

In step 612, the number of sibling files having an LCS that matches the longest LCS determined in step 608 is determined and is referred to as the COUNT. For example, if the longest LCS from step 608 has a value of five, and there are a total of three sibling files each having an LCS having a value of five as well with respect to the suspect file, then the COUNT has a value of three. Next, it is determined how many executable sibling files have been compared against the suspect file. For example, if a total of twenty sibling files from the folder (or any sub-folders) have been compared against the suspect file, then that is referred to as the sibling Count.

Next, step 616 determines whether the ratio of the COUNT divided by the sibling Count is greater than a particular numeric threshold. If the ratio is greater than the threshold this indicates (as one would expect) that there are a relatively large number of sibling files all containing the longest LCS, in which case it is likely that the suspect file is not malware because its particular property under consideration (such as the company name) matches fairly well with a relatively large number of other sibling files. In this case, control moves to step 620 and it is indicated that the property of the suspect file is similar to others of the sibling files. Any of a variety of numeric thresholds may be used. In one specific embodiment, the numeric threshold for use with the company name or the product name property is 0.25.

On the other hand, if the ratio is less than a threshold, this indicates that a relatively few number of sibling files (or no sibling files) include the longest LCS, in which case it is a possibility that the suspect file is indeed malware. Nevertheless, in one embodiment, control returns to step 604 to compare another property of the suspect file with the same property of the other sibling files. For example, if the company name property of the suspect file does not match with any of the sibling files, on the second time through the flow, the algorithm determines if the property product name of the suspect file does match the product name of any of the sibling files. It is possible that the product name (or a portion of it) would match many of the sibling files, in which case the answer to step 616 would be "Yes" and step 620 would indicate that a property of the suspect file is similar to others of the sibling files. In one embodiment, all that is needed is for one property of the suspect file to match with a certain number of the sibling files (according to the algorithm and test of FIG. 6) in order for the suspect file to be deemed benign. In other embodiments that are more cautious, it may be required that two or more properties of the suspect file must match with a certain number of the sibling files.

In an alternative embodiment, the vendor of a particular software application, a system administrator, or an end-user may manually enter property information under the "Summary" tab (for example) for properties such as title, subject, author, category, keywords, and comments for particular files in order to ensure that these files are not considered malware. For example, if a given software application includes six executable files in a folder (or any subfolders), an individual may manually enter the same property value under one of the properties for all six of the files. In other words, under the property "author" for each of the six files, the value "Mark Twain" (for example) may be entered. Thus, if the algorithm of the present invention is configured to compare the property "author" for an executable file when one of the files is suspected of being malware, the algorithm would conclude that the executable file is not malware (and is not a false positive) because its property value of "Mark Twain" matches with six of the other files within the same folder. Such property values may be added after the software application has been installed on the end-user computing device, as opposed to property values that are already present when the software application arrives from the vendor. The end user may add random, arbitrary or unique property values that are unlikely to be chosen by malicious software. In this fashion, malware is less likely to obtain and use these property values because each end-user computer may use different property values.

Computer System Embodiment

Figure 7A:
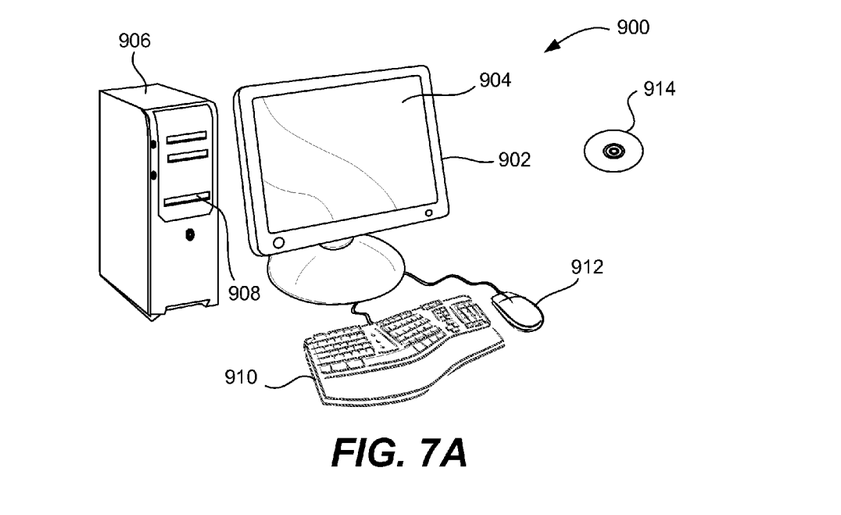
FIGS. 7A and 7B illustrate a computer system suitable for implementing embodiments of the present invention.
Figure 7B:
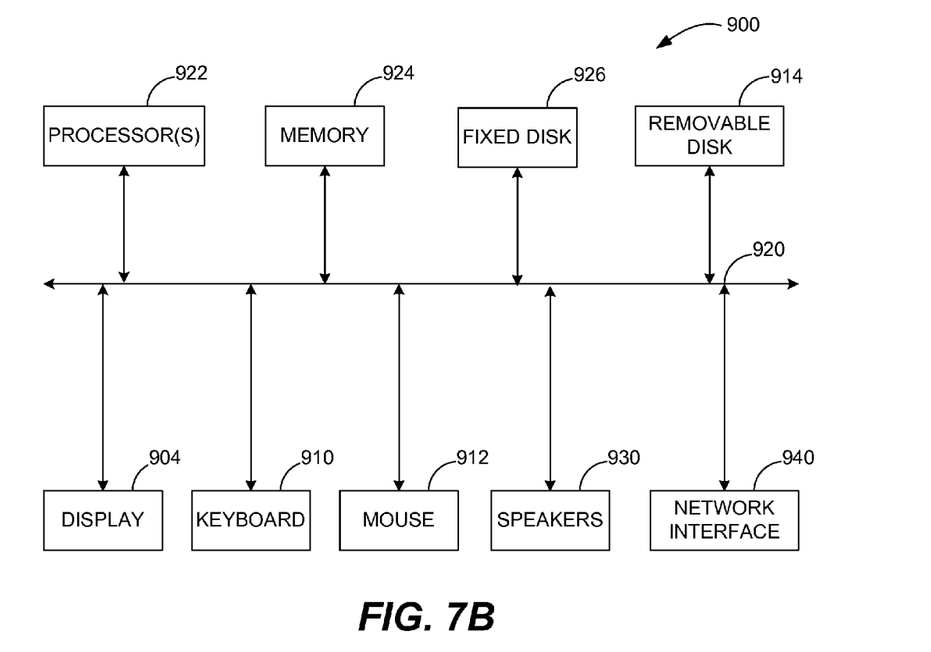

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:
1. A method of reducing false positives while detecting malware, said method comprising:
   determining that a computer file on a computing device is suspected of being malware by executing an antivirus program on said computing device;

in response to determining that the computer file is suspected of being malware, retrieving a property value of a property of said computer file;
for each of a plurality of other computer files within the same computer folder on said computing device as said computer file, retrieving a sibling property value of said property, wherein said same computer folder being the lowest level folder that contains said other computer files and said computer file;
comparing said property value with said sibling property values by executing an algorithm on said computing device;
determining whether said property value is similar to at least one other of said sibling property values; and
in response to determining that said property value is similar to at least one other of said sibling property values, outputting an indication on said computing device that said computer file is not malware and;
not performing any malware cleaning with respect to said computer file on said computing device.

2. The method as recited in claim 1, further comprising:
determining a longest common subsequence between said property value of said computer file and said sibling property value of each of said other computer files; and
making said determination that said property value is similar to at least one other of said sibling property values based upon said determination of said longest common subsequence.

3. The method as recited in claim 2, further comprising:
determining a ratio between the number of said other computer files sharing said longest common subsequence and the number of said other computer files; and
outputting said indication that said computer file is not malware when it is determined that said ratio is greater than a predefined threshold.

4. The method as recited in claim 1, further comprising:
comparing a second property value of said computer file with second sibling property values of said other computer files;
determining that said second property value is similar to at least one other of said second sibling property values; and
outputting said indication that said computer file is not malware only when said property value is similar to at least one other of said sibling property values and when said second property value is similar to at least one other of said second sibling property values.

5. The method as recited in claim 1 wherein said computer file and said other computer files are executable files.

6. The method as recited in claim 1 wherein said other computer files reside in said same computer folder and in subfolders of said same computer folder.

7. The method as recited in claim 1 wherein said same computer folder on said computing device indicates files that are stored together logically.

8. The method as recited in claim 1 further comprising:
exclusively comparing said property value with said sibling property values from said same computer folder.

9. The method as recited in claim 1 wherein said same computer folder does not include any sub-folders of said same computer folder.

10. A method of reducing false positives while detecting malware, said method comprising:
determining that a computer file on a computing device is suspected of being malware by executing an antivirus program on said computing device;
in response to determining that the computer file is suspected of being malware, retrieving a property value of a property of said computer file;
for each of a plurality of other computer files within the same computer folder on said computing device as said computer file, retrieving a sibling property value of said property, wherein said same computer folder being the lowest level folder that contains said other computer files and said computer file;
comparing said property value with said sibling property values by executing an algorithm on said computing device;
determining whether said property value is not similar to any of said sibling property values; and
in response to determining that said property value is not similar to any of said sibling property values, outputting an indication on said computing device that said computer file is malware and performing malware cleaning with respect to said computer file on said computing device.

11. The method as recited in claim 10, further comprising:
determining a longest common subsequence between said property value of said computer file and said sibling property value of each of said other computer files; and
making said determination that said property value is not similar to any of said sibling property values based upon said determination of said longest common subsequence.

12. The method as recited in claim 11, further comprising:
determining a ratio between the number of said other computer files sharing said longest common subsequence and the number of said other computer files; and
outputting said indication that said computer file is malware when it is determined that said ratio is less than a predefined threshold.

13. The method as recited in claim 10, further comprising:
comparing a second property value of said computer file with second sibling property values of said other computer files;
determining that said second property value is not similar to at least one other of said second sibling property values; and
outputting said indication that said computer file is malware only when said property value is not similar to at least one other of said sibling property values and when said second property value is not similar to at least one other of said second sibling property values.

14. The method as recited in claim 10 wherein said computer file and said other computer files are executable files.

15. The method as recited in claim 10 wherein said other computer files reside in said same computer folder and in subfolders of said same computer folder.

16. The method as recited in claim 10 wherein said same computer folder on said computing device indicates files that are stored together logically.

17. The method as recited in claim 10 further comprising:
exclusively comparing said property value with said sibling property values from said same computer folder.

18. The method as recited in claim 10 wherein said same computer folder does not include any sub-folders of said same computer folder.

19. A method of reducing false positives while detecting malware, said method comprising:
adding a property value to a property of a computer file on a computing device and adding the same said property value to said property of a sibling computer file within the same computer folder as said computer file, said property value being added after said computer file and said sibling computer file are installed on said computing device;

determining that said computer file on said computing device is suspected of being malware after said step of adding by executing an antivirus program on said computing device;

in response to determining that the computer file is suspected of being malware, retrieving said property value of said property of said computer file;

retrieving property values of said property of other computer files within the same computer folder as said computer file;

comparing said property value of said computer file with said property value of said sibling computer file by executing an algorithm on said computing device;

determining whether said property value of said computer file is the same as at least said property value of said sibling computer file; and in response to determining that said property value is the same as at least said property value of said sibling computer file, outputting an indication on said computing device that said computer file is not malware and not performing any malware cleaning with respect to said computer file on said computing device.

20. The method as recited in claim 19, further comprising:
determining a longest common subsequence between said property value of said computer file and said property value of said sibling computer file; and
making said determination that said property value is similar based upon said determination of said longest common subsequence.

21. The method as recited in claim 20, further comprising:
determining a ratio between the number of said other computer files sharing said longest common subsequence and the number of said other computer files; and
outputting said indication that said computer file is not malware when it is determined that said ratio is greater than a predefined threshold.

22. The method as recited in claim 19 wherein said computer file and said other computer files are executable files.

23. The method as recited in claim 19 wherein said other computer files reside in said same computer folder and in subfolders of said same computer folder.

24. The method as recited in claim 19 wherein said same computer folder on said computing device indicates files that are stored together logically.

25. The method as recited in claim 19 further comprising:
exclusively comparing said property value with said sibling property value from said same computer folder.

26. The method as recited in claim 19 wherein said same computer folder does not include any sub-folders of said same computer folder.

27. The method as recited in claim 19 wherein said same computer folder being the lowest level folder that contains said other computer files and said computer file.

* * * * *